No. 659,233. Patented Oct. 9, 1900.
R. C. HOYER.
FERTILIZER DISTRIBUTER.
(Application filed Mar. 15, 1900.)
(No Model.)
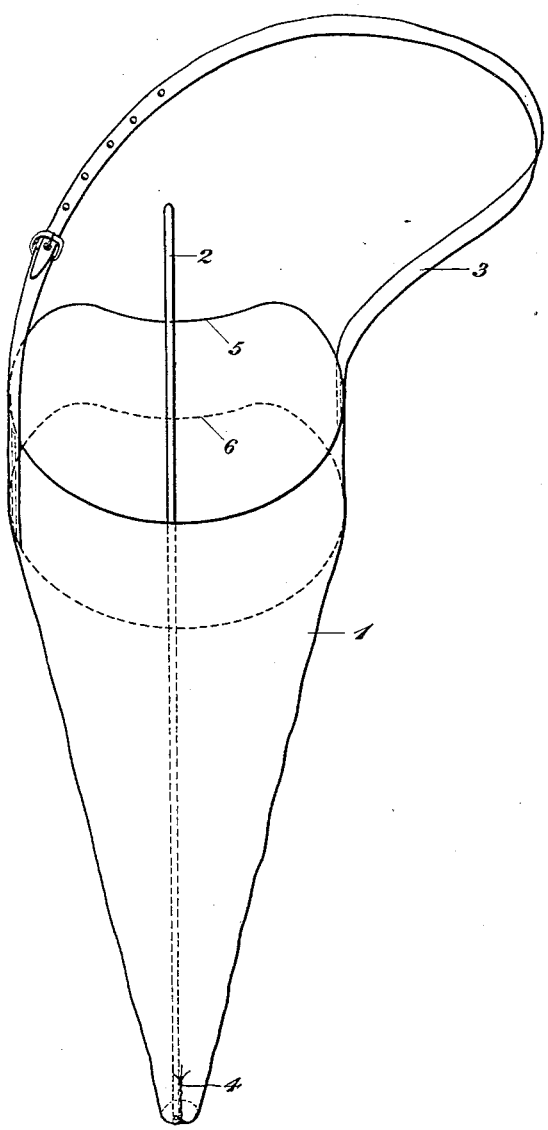
Witnesses
Walter H. Polk
C. L. Coleman
Rudolph C. Hoyer
Inventor

UNITED STATES PATENT OFFICE.

RUDOLPH C. HOYER, OF VICKSBURG, MISSISSIPPI.

FERTILIZER-DISTRIBUTER.

SPECIFICATION forming part of Letters Patent No. 659,233, dated October 9, 1900.

Application filed March 15, 1900. Serial No. 8,792. (No model.)

*To all whom it may concern:*

Be it known that I, RUDOLPH C. HOYER, a citizen of the United States, residing at Vicksburg, in the county of Warren and State of Mississippi, have invented a new and useful Improvement in Fertilizer-Distributers, of which the following is a specification.

My invention relates to improvements in fertilizer-distributers, and pertains to a flexible bag adapted to be suspended from the operator's shoulders, the bag having at its lower orifice a vertical slit, to the edge of which the end of a rod is attached, whereby provision is made to regulate the deposit of commercial fertilizer on the ground in a ready and economical manner, all of which will be fully described hereinafter.

Reference is to be had to the accompanying drawing, which is a perspective view of the invention.

1 is a flexible bag made of canvas or other suitable material. This bag is cone-shaped and is open at both ends. To the upper end, in order to keep it distended, a band or (preferably) two wire rings 5 and 6 are sewed, these rings having the shape shown in the drawing.

2 is a round rod, the lower end of which is securely fastened to one of the corners formed by a vertical slit 4 at the lower orifice of the bag, this rod 2 passing up through and projecting out of the upper opening of the bag. The loose end of this rod is shaped into a convenient handle.

3 is a strap, the ends of which are fastened to the upper edge of the bag at the rings 5 and 6. This strap is provided with a buckle for the purpose of adjusting its length.

In its operation the bag 1, which is of a capacity a man can easily carry, is filled with phosphate or other commercial fertilizer either before or after it is suspended from the operator's shoulders. The strap 3 is adjusted to the operator's height, so that the lower end of the bag will clear the ground as he walks. Grasping the handle the operator gives the rod a twisting motion to control the size of the lower orifice, and by a reciprocating motion of the rod up and down the disintegration and expulsion of the fertilizer is facilitated. Having thus complete control of the size of the orifice and the flow of the fertilizer therefrom, the operator is enabled to distribute any kind of fertilizer readily and economically at any point and in any quantity desired.

Having described my invention, I claim and desire to secure by Letters Patent—

In a fertilizer-distributer, a flexible bag, cone-shaped, open at both ends; the upper end of the bag distended by wire rings; a rod passing through and projecting out of the upper opening of the bag; the lower end of the rod secured to a lower corner of a vertical slit in the lower orifice of the bag; a strap secured to the upper edges of the bag; a buckle on this strap substantially as and for the purpose specified.

RUDOLPH C. HOYER.

Witnesses:
 WALTER H. POLK,
 C. L. COLEMAN.